US010136755B2

(12) United States Patent
    Talon

(10) Patent No.: US 10,136,755 B2
(45) Date of Patent: Nov. 27, 2018

(54) CODING INSERT FOR USE IN A FOOD PREPARATION MACHINE

(71) Applicant: NESTEC S.A., Vevey (CH)

(72) Inventor: Christian Talon, Vufflens-le-Chauteau (CH)

(73) Assignee: Nestec S.A., Vevey (CH)

( * ) Notice: Subject to any disclaimer, the term of this patent is extended or adjusted under 35 U.S.C. 154(b) by 56 days.

(21) Appl. No.: 15/116,996

(22) PCT Filed: Feb. 18, 2015

(86) PCT No.: PCT/EP2015/053406
§ 371 (c)(1),
(2) Date: Aug. 5, 2016

(87) PCT Pub. No.: WO2015/124619
PCT Pub. Date: Aug. 27, 2015

(65) Prior Publication Data
US 2017/0231421 A1    Aug. 17, 2017

(30) Foreign Application Priority Data
Feb. 19, 2014 (EP) .................. 14155834

(51) Int. Cl.
    A47J 31/40    (2006.01)
    A47J 31/44    (2006.01)
    B65D 85/804   (2006.01)
(52) U.S. Cl.
    CPC ...... A47J 31/4492 (2013.01); B65D 85/8043 (2013.01)

(58) Field of Classification Search
    CPC ........ A47J 31/4492; A47J 31/44; A47J 31/36; A47J 31/22; A47J 31/002; B65D 85/8043
    USPC .............................. 99/280, 295, 323; 429/77
    See application file for complete search history.

(56) References Cited

U.S. PATENT DOCUMENTS

2012/0251677 A1* 10/2012 Yoakim .................. A47J 31/22
                                                    426/112
2012/0260805 A1* 10/2012 Ozanne ............... A47J 31/3623
                                                      99/280

FOREIGN PATENT DOCUMENTS

| EP | 1654966    | 5/2006 |
| GB | 2499201    | 8/2013 |
| WO | 2012118367 | 9/2012 |
| WO | 2013046149 | 4/2013 |
| WO | 2014029803 | 2/2014 |

* cited by examiner

Primary Examiner — Dana Ross
Assistant Examiner — Joseph Iskra
(74) Attorney, Agent, or Firm — K&L Gates LLP

(57) ABSTRACT

The disclosure is directed to a coding insert for associating to a food ingredient capsule adapted to be functionally inserted in the cavity of a food preparation machine, characterized in that said coding insert is a disc or a ring that comprises at least one deformable portion that is deformed when said insert is inserted into the machine cavity, and/or when said cavity is closed, so that at least one machine operational parameter is set by detection of there action force on the machine cavity by the deformed portion, so as to customize the machine brewing functional parameters to each coding insert inserted therein with the capsule it is associated with.

14 Claims, 8 Drawing Sheets

CODING INSERT FOR USE IN A FOOD PREPARATION MACHINE

CROSS-REFERENCE TO RELATED APPLICATIONS

The present application is a National Stage of International Application No. PCT/EP2015/053406, filed on Feb. 19, 2015, which claims priority to European Patent Application No. 14155834.6, filed Feb. 19, 2014, the entire contents of which are being incorporated herein by reference.

FIELD OF THE INVENTION

The present invention concerns a coding insert for use with ingredient capsules in a food preparation machine, for instance in a beverage preparation machine.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid or semi-rigid capsule.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure inside the capsule chamber during extraction and/or dissolution of the capsule contents is typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patents no EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

Capsules have been developed for such an application of food preparation, and in particular for beverage preparation, which are described and claimed in applicant's European patent EP 1784344 B1, or in European patent application EP 2062831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted, or a soluble ingredient or mix of soluble ingredients,
- an aluminium membrane disposed at the bottom end of the capsule, closing the capsule, for retaining the internal pressure in the chamber.

The aluminium membrane is designed for being pierced with piercing means that are either integral with the capsule, or located outside of said capsule, for example within a capsule holder of the machine.

The piercing means are adapted for piercing dispensing holes in the aluminium membrane when the internal pressure inside the chamber reaches a certain pre-determined value.

Also, optionally, the capsule can further comprise means configured to break the jet of fluid so as to reduce the speed of the jet of fluid injected into the capsule and distribute the fluid across the bed of substance at a reduced speed.

Capsules of the prior art feature an injection wall or membrane (referred to as top membrane) which is to be pierced by a fluid injection element (e.g. needle) of a beverage preparation machine being part of a fluid system. When fluid is injected in the capsule compartment, a pressure is built up, which serves as an extraction means for extracting and/or dissolving ingredients contained inside the capsule, as described above. Such ingredients can be for instance a bed of roast and ground coffee. Alternatively or in combination with roast and ground coffee, the ingredients can comprise soluble ingredients, such as for instance beverage premixes.

Several systems are currently used for capsule identification by the machine, but the main drawback of existing solutions is the relatively high cost of identification systems and/or complexity and cost of a capsule adapted for such an identification. Such identification systems provide a good solution for automatically setting the machine operating parameters to the appropriate values, that are required for preparing a food product out of the specific ingredient contained in the capsule. Such operating parameters include but are not limited to volume of water to be injected in the capsule for mixing with the ingredient (the injected volume will correspond to the volume of product dispensed to the consumer's cup, minus a small residual volume that stays within the capsule at the end of the brewing cycle). Machine operating parameters also include pressure of the injected water, which varies depending on the ingredient (it is typically lower for soluble products, and higher for extraction of roast and ground coffee powder for instance). Machine parameters also include the temperature of water injected within the capsule, which can be chilled, at ambient temperature, or at a high temperature of about 80 to 90° C.

They include but are not limited to: colour recognition, barcodes, recognition of protrusions, grooves, or other artifacts located at the surface of the capsule, conductivity, resistivity and generally all means known for detection or identification of the capsule by means of an electric current or magnetic field. Furthermore, current identification means are embedded in the capsule, and do not allow to automatically set a food preparation machine to the right operating parameters, with capsules that do not contain a built-in identification code for interacting with the machine.

It is therefore an objective of the present invention to provide a means for use with inexpensive capsules that allows to automatically set the machine to the appropriate operating parameters adapted to the preparation of the specific food ingredient contained in said capsule.

SUMMARY OF THE INVENTION

The objective set out above is met with a coding insert for associating to a food ingredient capsule adapted to be functionally inserted in the cavity of a food preparation machine, characterized in that said coding insert is a disc or a ring that comprises at least one deformable portion that is deformed when said insert is inserted into the machine cavity, and/or when said cavity is closed, so that at least one machine operational parameter is set by detection of the reaction force on the machine cavity by the deformed portion, so as to customize the machine brewing functional parameters to each coding insert inserted therein with the capsule it is associated with.

By "at least one deformable portion" of the coding insert, it is meant that at least one part of the insert has a shape, or is made of a material, that makes this part deformable mechanically, either elastically or plastically when a load is applied to it. This mechanical deformation of at least one portion of the insert is caused by a mechanical load applied by the machine onto the insert, at the time the assembly capsule-insert is inserted into the machine cavity, and/or at the time the machine cavity is closed to functionally enclose said capsule and insert. Several embodiments will be described in the following detailed description.

By "deformation properties", it is meant that each object—in the present case a deformable portion of an insert—as a specific material behaviour that depends from its shape and the material that makes it. The deformable material behaviour law states that the force with which the deformable portion of the coding insert pushes back when a load is applied onto it that makes it move from an equilibrium position, is a function to the distance of said tongue from this equilibrium position. In other words, depending on the type of material, size and geometry of each object, and the forces applied, various types of deformation may result.

By "operational data", it is meant any data that is functionally relevant to operate the machine, in order words, any data that can be used by the machine electronics to set a beverage preparation parameter. More precisely, an operational data corresponds to the setting value of a beverage preparation parameter, for instance if the beverage preparation parameter is water temperature, the operational data will be the value for this water temperature that is programmed in the machine electronic board so that said electronic board actuates the water heater to heat water at a certain corresponding temperature. In the present case of a food or beverage preparation machine, temperatures used for the water that is mixed with a precursor ingredient to make the final food or beverage product are generally within the range of 4° C. to 100° C., preferably within the range of 12° C. to 85° C. As a more precise example, most beverage preparation machines on the market use two different temperatures, depending on the type of beverage to be produced. In this case, the machine operational data that corresponds to water temperature can have the value "hot" or "cold", depending on which type of beverage is brewed (such a value is of course coded within the machine electronic program as a digital value).

Preferably, the deformable portion of each insert is selected within the list of:
  (i) a series of tongue-shaped protrusions,
  (ii) a series of wave-shaped protrusions,
  (iii) a coiled spring portion,
  (iv) a series of curved flexible arches that extend inwardly and upwardly from the lowermost inner surface of the coding insert, towards the centre of said insert,
  (v) a series of curved protrusions oriented downwardly, which extend from a bottom edge of the insert,
  or a combination thereof.

Also preferably, said deformable portion is located at the periphery of said insert.

In a first possible embodiment of the invention, at least one of the external dimensions of the insert-capsule assembly is greater than the corresponding internal dimensions of the cavity, and wherein the deformable portion is located such as to allow said insert to compress elastically and fit within said cavity when the latter is closed in a functional configuration.

In a second alternative embodiment of the invention, at least one of the external dimensions of the insert-capsule assembly is smaller than the corresponding internal dimensions of the cavity, and wherein the deformable portion is located such as to allow said insert to expand elastically and fit within said cavity when the latter is closed in a functional configuration.

In a preferred embodiment of the invention, the deformable portion is deformable with an amplitude comprised between 0.1 mm and 20 mm, preferably comprised between 0.15 mm and 10 mm, more preferably comprised between 0.5 mm and 5 mm.

Furthermore, the deformable portion is preferably oriented such that it deforms along an axis D which is substantially parallel to the vertical axis of the capsule to which said coding insert is associated.

Also, the deformable portion is deformable by action of a force that is preferably comprised between 0.2N and 500N, more preferably between 20N and 300N.

The present invention is also directed to a food preparation system comprising a coding insert as described above, an ingredient capsule, and a food preparation machine adapted to cooperate functionally with said capsule-insert assembly, said machine comprising a cavity for alternatively receiving said capsule-insert assembly such that a food product can be prepared in the latter by injection of a fluid from said machine into said capsule, characterized in that said cavity comprises a force sensitive portion adapted to cooperate with the deformable portion of the coding insert to transmit data relative to food preparation settings, from said insert to said machine, said data being function of the mechanical deformation properties of said deformable portion.

Preferably, the force sensitive portion is linked to a control board of said machine, such that cooperation between said machine sensitive portion and said insert deformable portion is able to trigger an operation within said machine when the deformable portion transmits a mechanical deformation to said pressure sensitive portion, said operation being a recognition switching said machine on or off, and/or setting a food preparation parameter comprised within the list of, but not limited to: volume, temperature, and/or viscosity of the food to be dispensed, pressure of the fluid injected within the capsule, and/or infusion/mixing time.

Also preferably, said pressure sensitive portion is a force sensor connected to an electrical board.

The food product is preferably a liquid or semi-liquid product prepared within the capsule by injecting a fluid to be mixed with the encapsulated ingredient, at a pressure comprised between 0.5 and 30 bar, preferably comprised between 1 and 20 bar, more preferably a pressure comprised between 2 and 15 bar.

The present invention is further directed to a kit of at least two coding inserts as described, above, wherein different coding inserts in the kit comprise deformable portions with different predetermined mechanical properties so as to customize the machine brewing functional parameters to each coding insert inserted therein with a capsule.

Preferably, the deformable portion of each coding insert in the kit is selected within the list of:
(i) a series of tongue-shaped protrusions,
(ii) a series of wave-shaped protrusions,
(iii) a coiled spring portion,
(iv) a series of curved flexible arches that extend inwardly and upwardly from the lowermost inner surface of the coding insert, towards the centre of said insert,
(v) a series of curved protrusions oriented downwardly, which extend from a bottom edge of the insert,
or a combination thereof.

As a general principle underlying the invention, the deformation applied to the deformable portion of the insert follows a material behavior law, such that the force generated by the deformation of said deformable portion is a direct function of said deformation, whatever the type of deformation: compression, flexion or torsion. In all types of deformation, the material behavior law states that the force with which the spring, or tongue or twisted portion, pushes back is a function to the distance from its equilibrium length, as follows:

$$F=f(x)$$

where
"x" is the displacement vector—the distance and direction the deformable portion is deformed from its equilibrium length.
"f(x)" is the magnitude and direction of the restoring force the spring exerts.

Coil springs and other common springs typically obey Hooke's law. There are useful springs that don't: springs based on beam bending can for example produce forces that vary nonlinearly with displacement.

In the case of the present invention, it is assumed that the deformable portion of the insert is a complex spring element, which produces a force under deformation that is not necessarily linearly linked to the deformation amplitude.

By "food", it is meant any kind of edible product. This encompasses but is not limited to: pasty, semi-liquid, liquid products having more or less viscosity, such as liquid beverages (e.g. teas, coffee, chocolate-based beverages, soups), purees, ice cream or sorbets, soft ice cream, yogurt preparations, infant nutrition such as infant milks, cereal-based preparations.

In a preferred embodiment of the present invention, said food products are liquid or semi-liquid, and in particular cold, ambient, or hot beverages. In the following description, it will be considered as an example, that the capsule is used with a liquid beverage preparation machine.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

The coding insert 100 according to the present invention is meant to be used in association with a food preparation capsule 11 containing a food ingredient, preferably a beverage ingredient. The assembly of the coding insert 100 and the ingredient capsule are then to be inserted into the brewing cavity of a beverage preparation machine 1 illustrated in FIG. 1, thus forming a beverage preparation system.

Figure 1:
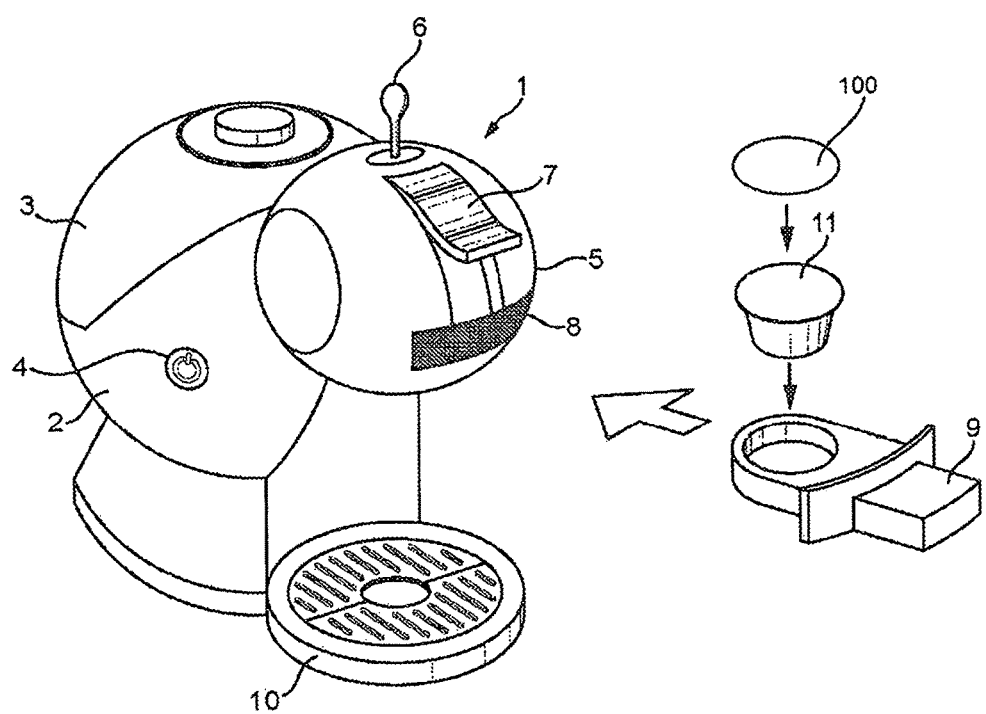
FIG. 1 is a schematic perspective view of a food/beverage preparation machine suitable for use with an ingredient capsule and coding insert according to the invention.

As shown in FIG. 1, the machine 1 comprises a machine body 2, a water reservoir 3 that can be removed from the machine body 2 for refill. The body 2 comprises a on/off push button 4. The machine 1 further comprises a extraction head 5. The head 5 comprises a water temperature selector 6 for hot or cold water, a locking lever 7, and an opening 8 for insertion of a capsule holder 9. The machine 1 further comprises a cup tray 10, for holding a cup under the extraction head.

Figure 2A:
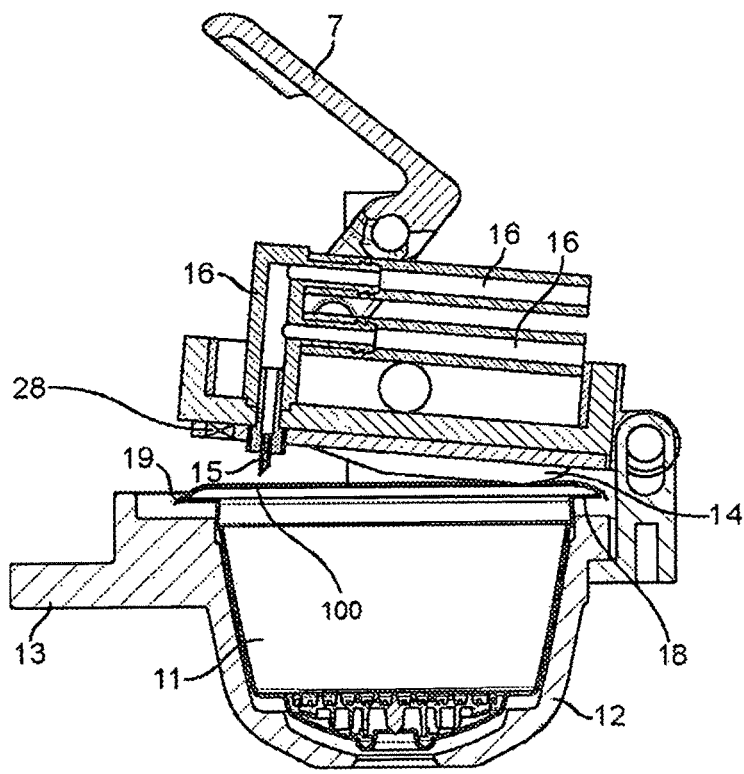
FIGS. 2A and 2B are schematic perspective views of an assembly comprising an ingredient capsule with a coding insert according to the invention, both inserted into an open (2A), respectively closed (2B), receptacle of a food/beverage preparation machine.
Figure 2B:
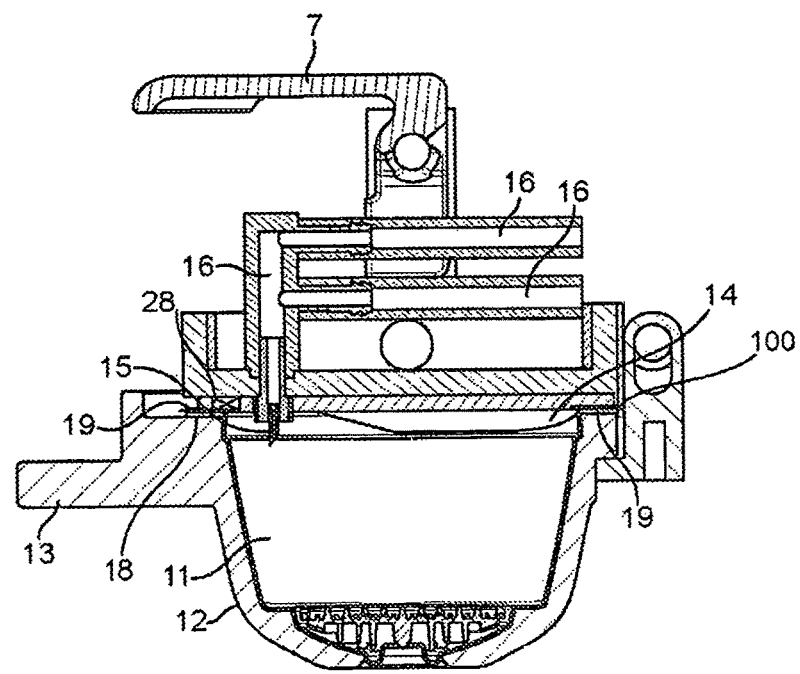

The capsule holder 9 is adapted to receive the capsule 11 associated to the coding insert 100. A profile cut view of the capsule holder 9 is shown in FIGS. 2A and 2B, wherein a capsule 11 is disposed together with the coding insert 100, said holder 9, capsule 11, and coding insert 100 being inserted into the corresponding receptacle of the extraction head. The capsule holder 9 comprises a body portion 12 designed as a receptacle for the capsule 11, and further comprises a handle 13.

The capsule 11 comprises a capsule body which has a generally frusto-conical body, closed at its bottom by a bottom wall integrally formed with the body side walls. The centre of the bottom wall comprises an opening which serves as a dispensing opening to let the beverage prepared therein, flow out of said capsule into a cup placed here below. The capsule further comprises a pierceable aluminum membrane that is sealed inside the capsule, close to the bottom wall, as well as a piercing plate for piercing said aluminum membrane when pressure inside the capsule increases. The piercing plate is located between the aluminum membrane and the bottom wall of the capsule. Finally, the capsule is closed at its top by a pierceable membrane. The capsule is made such that it is moisture and oxygen barrier.

The coding insert 100 according to the present invention can be a disc as illustrated in FIG. 1, or it can take the form of a ring as shown in FIGS. 2A to 12. According to the invention, the coding insert is designed to be associated to the ingredient capsule, so that when the assembly capsule-insert is inserted into the machine, the machine senses the code embedded into the insert and converts said code into appropriate beverage preparation parameters adapted to best suit the requirements of the ingredient contained in the capsule. The code within the insert 100 is a mechanical deformation profile, as will be explained later on in the following description.

The coding insert 100 according to the present invention can be associated to a capsule 11 in an assembly by simply placing said insert at the surface of said capsule, preferably at the upper side, or at the lower side of said capsule. However, the association into an assembly can be made by attaching said insert 100 to said capsule in a permanent or removable manner, by: clipping (i.e. clip-fastening), gluing, taping, screwing, bayonet-fitting, or a combination thereof.

The shape and size of the coding insert 100 are such that they allow a proper fitting to the capsule, and then into the machine cavity. Preferably, the diameter of the disc-shaped or ring-shaped insert is equivalent to the diameter of the capsule surface to which it is assembled, as illustrated in FIGS. 2A, 2B, 10B, 11 and 12. This diameter of the insert is comprised preferably between 10 mm and 150 mm, preferably between 15 mm and 50 mm. The overall thickness of the coding insert 100 is comprised preferably between 0.5 mm and 20 mm, more preferably between 1.5 mm and 7 mm. It can be manufactured out of any suitable material that is able to deform when subject to an external mechanical constraint, but it should preferably have mechanical characteristics that provide good elasticity, such as metal, rubber, alloy, paper, cardboard, and preferably thermoplastics. Very rigid and fragile materials like glass should be avoided. In the preferred embodiment where the coding insert is made of a thermoplastic material, it is preferably injected, or co-injected if several plastics are used. Suitable thermoplastic materials include, but are not limited to: polyethylene (PE), polypropylene (PP), polystyrene (PS), polyoxymethylene (POM), polyacrylate (PA), rubber, or a combination thereof.

More precisely, FIG. 2A represents a capsule 11 loaded within a capsule holder 9. A coding insert 100 in the form of a plastic ring is placed on the top of the capsule upper surface, so that both the capsule 11 and the coding insert 100 form an assembly. In this embodiment, the insert is not fixed to the capsule, but is placed onto the latter in a removable manner. The outer diameter of the coding insert 100 is such that substantially corresponds to the diameter of the capsule upper surface and does not substantially protrude outside of the capsule upper edges 18, as illustrated in FIG. 2A.

The capsule holder 9 loaded with said capsule 11 and coding insert 100, are inserted into the extraction head 5 when the latter is in the open position illustrated in FIG. 2A. In that open position, the locking lever 7 is in the upward position, unlocked. The extraction head 5 comprises a movable needle plate 14 with a needle 15 adapted for piercing through a wall of the capsule and injecting water (or another fluid) under pressure within the capsule. Water under pressure is pumped by a pump of the machine, from the water reservoir 3, through a system of pipes (not illustrated) and fluid connectors 16 of the extraction head 5. When the extraction head 5 is in the open position, the needle plate is placed away from the capsule holder, as well as the needle 15 which is distant from the capsule, as illustrated in FIG. 2A.

When the consumer actuates the locking lever 7 downwards as shown in FIG. 2B, the needle plate 14 is moved downwards and the extraction head 5 is closed. In that position, the needle 15 pierces through the top wall of the capsule, and is in proper configuration for water injection under pressure therein. The inner diameter of the ring-shaped coding insert 100 is such that it allows piercing of the capsule upper wall by the machine injection needle 15 when said machine is closed in a functional configuration (i.e. with the capsule inserted therein and ready for injection of water inside the capsule), as illustrated in FIG. 2B.

In other words, as can be understood, the extraction head 5 of the machine comprises a capsule receptacle having a volume and shape substantially similar to the external volume and shape of a capsule, with the provision of the volume of the coding insert 100. The capsule receptacle of said extraction head is defined by the capsule holder 9 and the needle plate 14 located above the capsule holder. The needle plate is movable substantially vertically towards, and away from, said capsule holder, in order to respectively close, and open the capsule receptacle. When the needle plate is lifted away from the capsule holder, i.e. when the extraction head is in the open position, the capsule holder can be moved into, or out of, the extraction head by sliding it like a drawer. FIG. 2B shows the extraction head closed with the capsule holder loaded with a capsule, and inserted therein, and the needle plate in the closed (i.e. moved down) position. As it is apparent in FIG. 2B, in that closed position, the external volume and shape of the assembly comprising the capsule 11 assembled to the coding insert 100, generally correspond and fit to the volume and shape of the receptacle defined by the capsule holder and needle plate.

The data embedded into the coding insert can correspond to the type of ingredient contained in the capsule, and/or it can correspond to one or several parameters for preparation of a food or beverage from the capsule. Typically, such data is read by a mechanical reading device 28 embedded in the machine, such as a pressure force sensor installed in the factory.

The pressure sensor 28 can be installed within the machine at any suitable location that will allow said sensor to sense the elastic and/or plastic deformation of the insert when the latter is introduced together with the capsule in the receptacle of the machine, or at the time said receptacle is being closed. For instance, the sensor 28 can be integrated to the needle plate 14 as illustrated in FIGS. 2A and 2B, and function such that once the capsule 11 and coding insert 100 are introduced within the capsule holder 9 of the machine 1, the sensor 28 will be able to sense the deformation of the insert when the capsule-receiving cavity (i.e. receptacle) of the machine is closed and said needle plate 14 is brought in contact with the elastically deformable portion of the insert as shown in FIG. 2B.

In that position, as illustrated in FIG. 2B, the insert deformable portion (several alternative embodiments of such deformable portions will be given hereafter) is deformed elastically which produces a deformation force which can be sensed by the machine as the sensor 28 is in contact with, and presses onto the coding insert which is itself placed onto the upper side of the capsule. The sensed value of the mechanical deformation is converted by a program memorized in a machine electronic chip (or board), into a machine operational data such as a water temperature value, or a volume of water to be pumped through the capsule from the machine reservoir.

The force sensor 28 can be integrated either in the beverage preparation machine as described above, or alternatively in the capsule holder 9. The force sensor can actually be integrated in any location of the machine or capsule holder, as long as said sensor is in contact with the coding insert—particularly with the deformable portion of the latter—when said coding insert and capsule are functionally inserted within the machine and/or capsule holder.

Due to the spring effect, a counterforce is applied by the coding insert 100 to the machine, and more precisely to the force sensor that is integrated in said machine.

Depending on the counterforce measured by the force sensor 28, the machine reads at least one beverage preparation data concerning the ingredient contained in the capsule and/or the parameters to prepare a beverage out of said ingredient. The translation of the counter pressure measurement into a data is performed by using a computer chip integrated inside the machine, which interprets the pressure that is sensed and converts it into a value for a beverage preparation setting, or any other similar data such as the type of capsule that is inserted, or type of beverage ingredient contained inside the capsule. During insertion of the assembly capsule-coding insert, and/or closing of the machine cavity, more than one measurement can be performed by the force sensor, the various measurements being done for various predetermined amplitudes of deformation of the coding insert deformable portion.

The deformable portion of the insert 100 can take various forms, shapes and dimensions, some of which will now be described in more detail with reference to the accompanying drawing, as examples.

Figure 3:
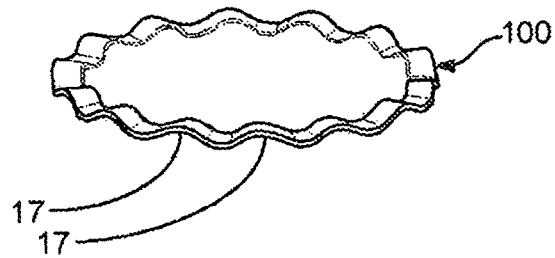
FIGS. 3 to 9 are schematic perspective views of alternative embodiments of a coding insert according to the invention.
Figure 4:
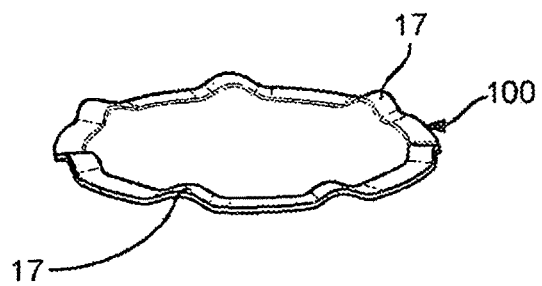

In a first embodiment illustrated in FIG. 3, the deformable portion of the insert 100 can take the form of a series of wave-shaped protrusions 17 located at the periphery of the insert. The number of wave-shaped protrusions 17 across the periphery of the coding insert 100 can vary, depending on the force (counter-pressure) required for carrying data, according to the principle of the invention. As shown in FIG. 4, the number of wave-shaped protrusions 17 can be diminished compared to that of the insert shown in FIG. 3, if need be. In this embodiment, the more wave-shaped protrusions 17, the greater the force generated by the coding insert for a given deformation amplitude.

When a coding insert 100 according to this first embodiment is placed in a capsule holder together with a capsule, and functionally inserted into the corresponding recess of the beverage preparation machine, the top surface of the wave-shaped protrusions 17 protrudes above the level of the capsule holder's upper surface. The insert is therefore higher than the capsule holder, such that when the user closes the machine head—as described above with reference to FIG. 2B—the lower surface of the needle plate 14 is brought in contact with the tip portion of each protrusion 17. When the locking lever 7 is pressed downwards to completely close the machine head, a pressure is exerted onto the wave-shaped protrusions 17 by the needle plate 14, which causes an elastic deformation of said protrusions 17. This deformation causes the protrusions to mechanically exert a counterforce onto the needle plate. Said needle plate comprises a pressure sensor (not illustrated in the drawing), which is more precisely a force sensor, which senses the counterforce applied by the deformed protrusions 17. The counterforce that is created is function of the mechanical characteristics of the protrusions 17, more specifically, it is function of their constitutive material, of their shape, in particular their thickness and their curvature. And it is also function of the amount of protrusions, which can vary as explained above: a higher number of protrusions will provide a higher quantity of energy in the spring effect generated by the deformation of said protrusions, that is to say, a higher counterforce.

Figure 5:
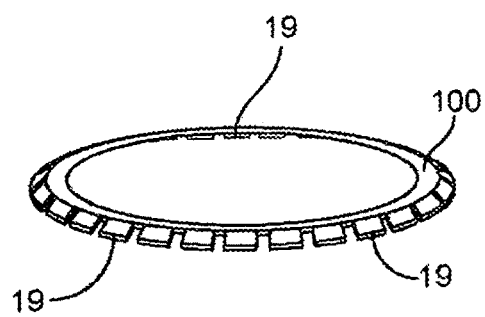
Figure 6:
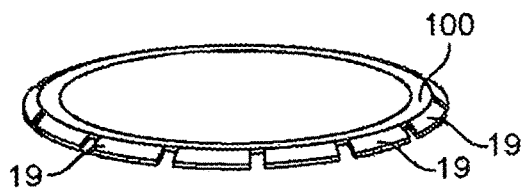

In a second embodiment illustrated in FIG. 5, the deformable portion of the coding insert 100 comprises a plurality of tongues 19. The number and width of the tongues can vary, and for instance, FIG. 6 shows a coding insert wherein the tongues are less numerous but wider than those shown in the embodiment of FIG. 5. The tongues shown in FIGS. 5 and 6 extend outwardly from the peripheral edge of the insert, and are directed downwards, with an angle comprised between 0 and 70 degrees relative to the horizontal plane. In this case, the tip of the tongues rest on the top surface of the capsule holder 9 when the insert is placed onto the upper surface of a capsule 11 and both are inserted therein as illustrated in FIG. 2A, such that when the beverage machine extraction head 5 is closed by the user, the needle plate 14 that moves downwards comes in contact with the upper surface of the coding insert and presses the latter downward during the closing movement of the machine head 5.

This results in the tongues 19 being deformed elastically and their tip moved upward to allow closure of the head 5. When the extraction head is closed, the tongues 19 are pinched between the upper surface of the capsule 11 and the lower surface of the needle plate 14, such that said tongues are oriented generally in the same plane as the rest of the capsule top edge 18 as illustrated for instance in FIG. 2B, i.e. generally horizontally.

When the extraction head is opened again, and the needle plate 14 moves upwards, the tongues 19 move back to be oriented downwards again as shown in FIG. 5 or 6, and such that the coding insert is moved automatically up from the capsule holder 9. In this position, the deformable portion of the insert, i.e. the tongues 19, is deformed and the mechanical deformation produces a counterforce onto the elements of the machine extraction head, in particular onto the needle plate and the pressure sensor integrated therein, as shown in FIG. 2B. The mechanical deformation is sensed by the sensor and converted by the machine electronic chip into a machine operation data, such as a volume, pressure, or temperature setting parameter value for the water that is to be delivered by the machine into the capsule. The mechanical deformation of the tongues 19 can either be elastic (i.e. reversible) or plastic (i.e. permanent). Furthermore, the sensor can be programmed to sense one deformation force value, at one given time (for instance when the machine extraction head is completely closed), or alternatively, the sensor 28 can be programmed to sense and memorize various deformation force values of the insert, while the machine extraction head is being closed. In this latter case, the machine can establish a deformation profile for the capsule, which is function of the material that is used for making the deformable portion of the insert (in the present embodiment, the material that is used for making the tongues 19). When sensing a mechanical deformation profile of the insert, rather than one single deformation force value, it is possible to program the machine to calculate several operational data. In other terms, the coding of setting parameters within the insert 100 becomes more complex and more than one information is coded within the insert structure. For instance, it is possible to code for water temperature and for the volume of water to be injected within the capsule as well, by sensing a deformation profile, rather than one single deformation value. The exact algorithm that is programmed in the chip of the machine can vary, and be appropriately chosen, depending on the insert structure, and also depending on how many different operational data should be embedded in the each insert structure.

For instance, only one operational data can be coded within the insert, which is e.g. water temperature. If only two types of temperature are to be coded, hot or cold, two different types of inserts will be made, each having different types of deformable portion. In the present embodiment, the first type of coding inserts can have small tongues as illustrated in FIG. 5. The small tongues, when deformed horizontally due to the extraction head being completely closed as illustrated in FIG. 2B, will generate a deformation force that is for example 0.5 N. This value of 0.5N is sensed by the sensor integrated in the needle plate, and will be converted into an operational data through a proper algorithm, into for instance a value "hot" for the water temperature, such that the machine heater will be started in order to produce hot water to be delivered to the capsule. In case a coding insert having larger tongues 19 (as shown in FIG. 6) is inserted into the machine, the deformation force sensed by the sensor will be different due to the different mechanical structure of the deformable portion of the insert (i.e. the tongues which in this case are larger). For instance, as the tongues are larger, their mechanical resistance is greater and the deformation force that will be generated is also greater, for instance 1N, when the extraction head is closed. In that case, the measured deformation force will be converted by the machine as a "cold" value for the water temperature to be injected into the capsule.

Instead of water temperature, other machine operational data can be converted from the sensed elastic or plastic deformation of the deformable portion of the insert.

Also, not only a portion of the insert such as the tongues 19 can be deformable, but the whole coding insert can be made of a deformable material. In that case, the result is the same and a sensor embedded in the machine so as to be in contact with the insert during closing and/or when the extraction head is closed, will be able to sense a mechanical deformation so that the machine program can convert it into a machine operational data (water temperature setting, or water pressure, or volume of water to be injected within the capsule).

Figure 7:
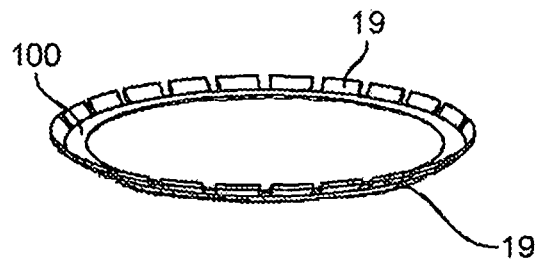
Figure 8:
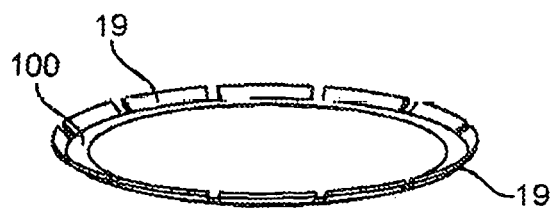

As an alternative, the tongues 19 can be directed upwards as shown in FIGS. 7 and 8, with an angle comprised between 0 and 70 degrees relative to the horizontal plane. In this embodiment, the deformation movement of the tongues 19 during closing of the machine extraction head is opposite to that described above in relation to FIGS. 5 and 6. More precisely, when the needle plate 14 moves downwards during closing of the extraction head 5, the tip of the tongues illustrated in FIGS. 7 and 8 come in contact with the lower surface of the needle plate 14, which presses and moves said tongues 19 downwards until the head is closed. In the closed position of the extraction head, the tongues are also positioned generally in the same plane as the rest of the insert, i.e. generally horizontally as shown in FIG. 2B. Then, after extraction when the user opens the extraction head 5 again, the needle plate 14 is moved upwards again, which releases the tongues. The latter move back upwardly to retrieve their normal shape as shown in FIG. 7 or 8.

Figure 9:
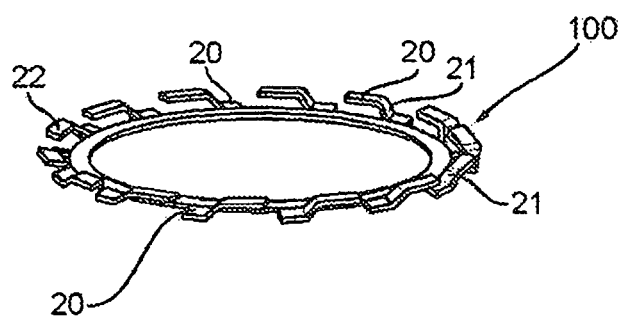

As an alternative to the straight tongues illustrated in FIGS. 5 to 8 and described above, the insert can comprise deformable tongues having a more complex shape as shown in FIG. 9. In this case, each tongue 19 comprises a first lower portion 20 which is generally horizontal, that links the tongue to the rest of the insert. The tongue further comprises a second intermediate portion 21 which is oriented upwardly, and a third upper portion 22 which is substantially horizontal as well as the first portion 20. The third portion 22 comes in contact with the lower surface of the needle plate 14 when the extraction head 5 is closed, while the first lower portion 20 of each tongue 19 rests onto the upper surface of the capsule. When the needle plate 14 moves downwards as a result of the extraction head 5 being closed, the intermediate portion 21 of each tongue deforms elastically to bring the upper portion 22 on the same plane as the first portion 20. When the extraction head is closed, each tongue is flattened and the elastic deformation causes said tongue to generate a counterforce which tends to separate the needle plate and capsule holder. This counterforce can be measured by a pressure sensor located for instance in the needle plate.

In the first and second embodiments described above in reference to FIGS. 3 to 9, the deformable portion of the coding insert is such that the upper portion of the insert protrudes out of the capsule holder when inserted therein as long as the insert is assembled to the capsule at the upper side of the latter (in some other embodiments of the invention not represented therein, coding inserts described above could be assembled at the lower side of the capsule). As a consequence, a suitable location for a pressure sensor will be in the needle plate, such that the counterpressure force generated by the deformed portion of the insert, will be measured when the needle plate comes in contact with, and starts to deform the wave-shaped protrusions 17, or the tongues 19 described above.

Importantly, it is clear that preferably, and as described above with reference to the first and second embodiments, the volume of the assembly comprising the coding insert 100 and the capsule 11, is greater than the volume of the receptacle in the extraction head of the beverage machine. As explained above, this difference of volume causes the insert to deform when said extraction head is closed, so as to adapt to a smaller volume. This deformation is directed to the deformable portion of said insert. This principle is considered a preferred option of the present invention. However, other possibilities to deform the deformable portion of the insert can be considered which will be described hereafter, in reference to a third embodiment and to FIGS. 10A and 10B.

Figure 10A:
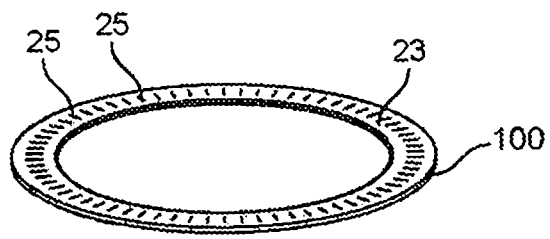
FIGS. 10A and 10B are schematic perspective views of another embodiment of a coding insert according to the invention.
Figure 10B:
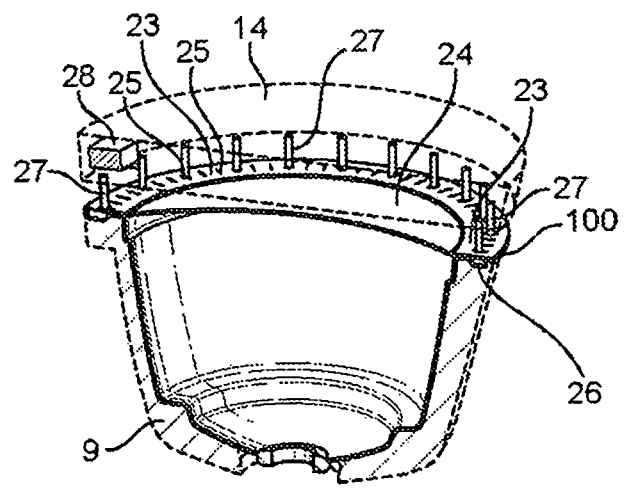

In a third embodiment illustrated in FIGS. 10A and 10B, the deformable portion of the insert takes the form of a deformable area 23 at the upper peripheral portion of the insert, in combination with a recessed portion 26 of the capsule top edge 18 as illustrated in FIG. 10B. This deformable area 23 of the insert 100 comprises slits 25 which extend radially in the middle part of the area 23, as shown in FIG. 10A. The slits 25 create weaknesses, hence deformable flexible portions in the coding insert thickness. Further, FIG. 10B shows the recessed portion 26 of the capsule top edge, which guarantees that the slitted deformable area of the insert can flex downwards into said recess 26, when a pressure is exerted onto said area 23 from above the insert.

The outermost portion of the machine needle plate 14 illustrated in dotted lines in FIG. 10B, comprises a series of pin-shaped protrusions 27 extending downwards, which are positioned so as to contact the deformable area 23 when the machine extraction head is closed and the needle plate moves downwardly towards the capsule and insert. In that position, the latter is positioned within the capsule holder 9 such that it rests on, and protrudes from, the top surface of said capsule holder, and such that the deformable area 23 is directly accessible from above said insert. During closing of the extraction head of the machine, when the needle plate 14 moves downwardly towards the capsule holder 9, coding insert and the capsule inserted therein, the pin-shaped protrusions 27 press onto the deformable area 23 of the insert and flex it downwardly into the recessed portion 26 of the capsule. The pin-shaped protrusions 27 are connected to, or part of, a pressure sensor 28 located in the needle plate 14, which senses and measures the elastic counterforce generated by the elastically deformed area 23 of the coding insert 100.

As already explained above, the measured force applied to the sensor by the deformed portion of the insert corresponds to a predetermined value, which depends from the mechanical properties of the insert, in particular which depends on the force constant "k" of the deformable portion. This measured force is directly linked to a data value, which corresponds to a beverage preparation parameter to be set in the machine. A computer chip of the beverage machine, will interpret the measured force as a given value for a beverage preparation parameter, such as a given temperature for the fluid that will be injected within the capsule, and/or a given fluid injection pressure, and/or a given volume of fluid to be injected within the capsule.

For instance, if the elastic force measured by the sensor is 0.02 N, the machine will interpret it to inject 60 ml of water at 83° C. within the capsule. If the measured value is 0.06N, the machine will inject 180 ml of ambient temperature water.

According to the invention, the mechanical properties, and particularly the elastic deformation properties of the deformable portion of the coding insert, are predetermined by carefully selecting such constructional parameters for the insert deformable portion (depending of which type of deformable portion is used) such as: the type of material which is used (for instance rubber), the shape of the deformable portion, e.g. thickness of the insert and width and length of the precut slits 25 in the embodiment described above, or the length, thickness and angle of deformable tongues, etc. The machine is then programmed so as to be able to translate the measured force into given beverage preparation parameters (e.g. volume, pressure, and/or temperature of the fluid injected in the capsule).

According to each particular embodiment of a deformable portion of the coding insert, the pressure sensor in the machine or in the capsule holder will be adapted accordingly, in order to be able to sense the elastic deformation force generated by the insert when said deformable portion is deformed.

Figure 11:
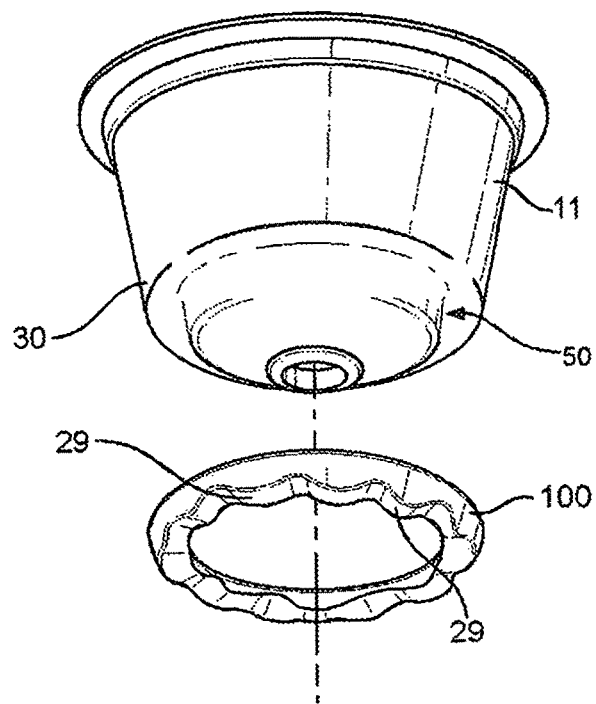
FIGS. 11 and 12 are schematic perspective views of yet two other embodiments of a coding insert according to the invention.

In a fourth embodiment illustrated in FIG. 11, the deformable portion of the insert comprises a series of curved protrusions 29 oriented downwardly, which extend from said coding insert 100. The curvature of each protrusion 30 provides sufficient flexibility to the latter to flex under pressure.

As shown in FIG. 11, the coding insert is a ring 100 that is shaped and dimensioned to fit exactly a recessed bottom 50 of the capsule 11, so that the outer diameter of the insert is substantially the same as the outer diameter of the capsule lateral walls in the region where the insert is assembled to said capsule. Also, the thickness of the coding insert is preferably such that it corresponds to the height of the recessed bottom. The coding insert can be snapped, clipped, or otherwise attached permanently or removably to the capsule by mechanical attaching means not illustrated in the drawing.

In use, when the assembled insert and capsule are introduced in the capsule holder, the protrusions 30 rest on a corresponding edge of the capsule holder (not shown in the drawing) such that the whole assembly capsule-coding insert is lifted compared to a capsule not associated to a coding insert, and such that the top edge 18 of the capsule is lifted above the level of the capsule holder upper surface.

When the extraction head of the machine is closed, the needle plate 14 presses onto the upper surface of the capsule, which is moved downwards, until the top edge 18 is in contact and rest upon the upper surface of the capsule holder. In that closed position of the extraction head, i.e. when the top edge 18 is pinched between the capsule holder and the needle plate (as shown for instance in FIG. 2B), the curved protrusions 29 of the insert 100 are elastically deformed upwardly (i.e. the protrusions 29 flex upwards inside the capsule).

In that position, the elastically deformed protrusions 29 generate a counterforce which is directed vertically towards the top of the capsule. This counterforce can be measured by a pressure sensor 28 located inside, or in contact with, the needle plate. When the extraction head of the machine is opened again, the needle plate is lifted away from the capsule and capsule holder. At that time, the protrusions 29 flex back in their normal position such that the capsule is lifted from the capsule holder. Beyond the advantage provided by the invention (i.e. the assembly capsule-coding insert contains beverage preparation parameter data inside the predetermined elastic deformation force generated by the protrusions 29), this embodiment is also interesting in that the effect of elastic deformation of the coding insert provides a lifting effect which facilitates handling of a used capsule and its removal from the capsule holder when the beverage is prepared and the capsule is to be disposed of: due to the fact that the top edge 18 of the capsule is positioned above the capsule holder, it is easier for the user to seize said top edge to remove the capsule from the capsule holder.

Figure 12:
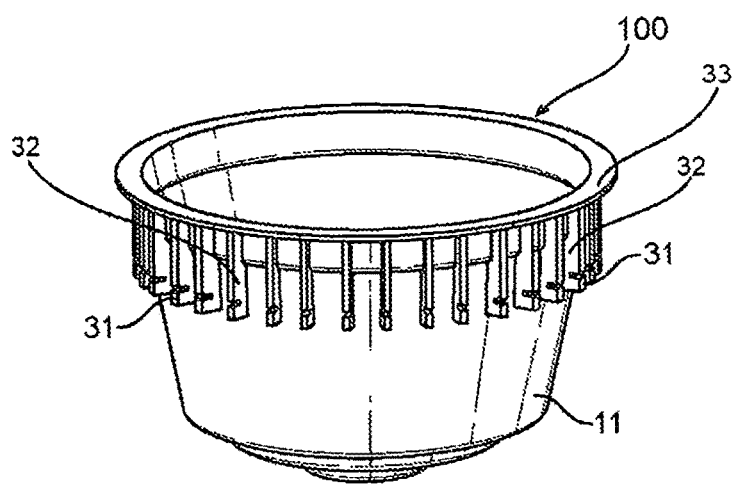

In a fifth embodiment illustrated in FIG. 12, the coding insert 100 is a ring that is adapted in diameter and height to fit the upper peripheral edge of a capsule 11. The deformable portion of the coding insert 100 comprises a series of horizontal tongues 31 located substantially at mid-height of the capsule, that extend from vertical pillars 32 that extend downwardly from the insert peripheral upper ring edge 33, as shown in FIG. 12. These tongues 31 are made integrally with the rest of the insert, preferably by injection moulding. the number of horizontal tongues 31 can vary, but there are at least three, preferably at least four, more preferably at least ten of them, which are equally distributed around the insert perimeter. When the coding insert is positioned onto the capsule, the horizontal deformable tongues 31 extend outside of the capsule body, outwardly, as shown in FIG. 12.

When the assembly composed of the coding insert 100 and the capsule 11, is inserted functionally into the capsule holder, the capsule bottom part is not in contact with the capsule holder, due to the fact that the horizontal tongues 31 rest upon a middle-height edge of the capsule holder. In this position, the whole insert—except for the horizontal tongues 31—is lifted from, and not in contact with, the capsule holder.

When the extraction head 5 of the machine is closed the needle plate 14 moves downwardly towards the insert. It contacts the upper edge 33 of the insert 100 and moves the whole insert downwardly, along the principle illustrated for instance in FIG. 2B. When the insert is moved into the capsule holder by the pressure exerted by the needle plate, the tongues 31 are flexed upwardly. The elastic deformation of the tongues 31 generates a counterforce directed vertically and upwardly, towards the needle plate. Similarly to the preceding alternative embodiments of the invention described above, this counterforce can be measured by a pressure sensor which is in direct or indirect contact with the upper surface of the insert.

Figure 13C:
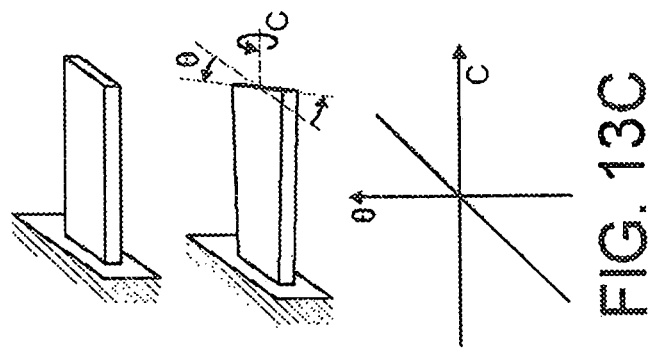
FIGS. 13A to 13C represent schematically and graphically the evolution of the elastic deformation of a solid deformable mechanical element as a function of the force applied to the same, respectively during: linear compression or stretching, bending, and torsion (i.e. twisting)
Figure 13B:
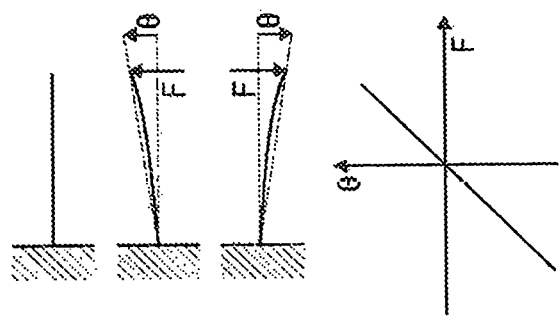
Figure 13A:
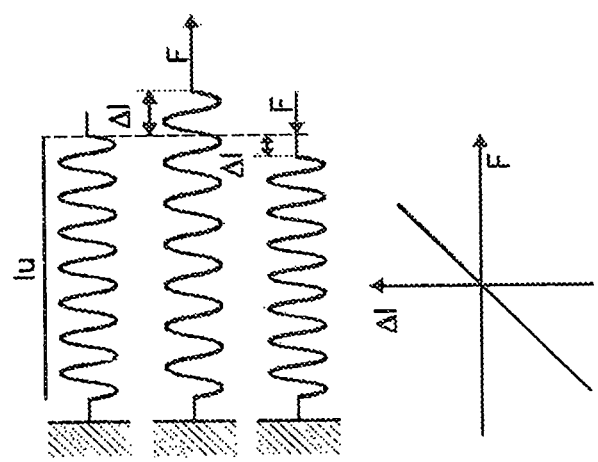

As a general principle underlying the invention, the deformation applied to the deformable portion of the insert follows a material behavior law, so that the force generated by the deformation of said deformable portion is a direct function of said deformation, whatever the type of deformation: compression (as in FIG. 13A), flexion (as in FIG. 13B) or torsion (as in FIG. 13C). In all types of deformation, the material behavior law states that the force with which the spring, or tongue or twisted portion, pushes back is a function to the distance from its equilibrium length, as follows:

$$F=f(x)$$

where

"x" is the displacement vector—the distance and direction the spring is deformed from its equilibrium length.

"f(x)" is the magnitude and direction of the restoring force the spring exerts.

In the case of a simple spring element, the elastic deformation force generated within the material is a direct, linear, function of the deformation amplitude ($F=k \cdot x$), and both are linked by a constant "k" which is known as the "spring constant" or "Young's modulus", which is an intrinsic characteristic of the material.

As explained above, the general principle of the present invention is that the factor "k" for each insert is measured and interpreted by the beverage preparation machine as a beverage preparation parameter.

Figure 14:
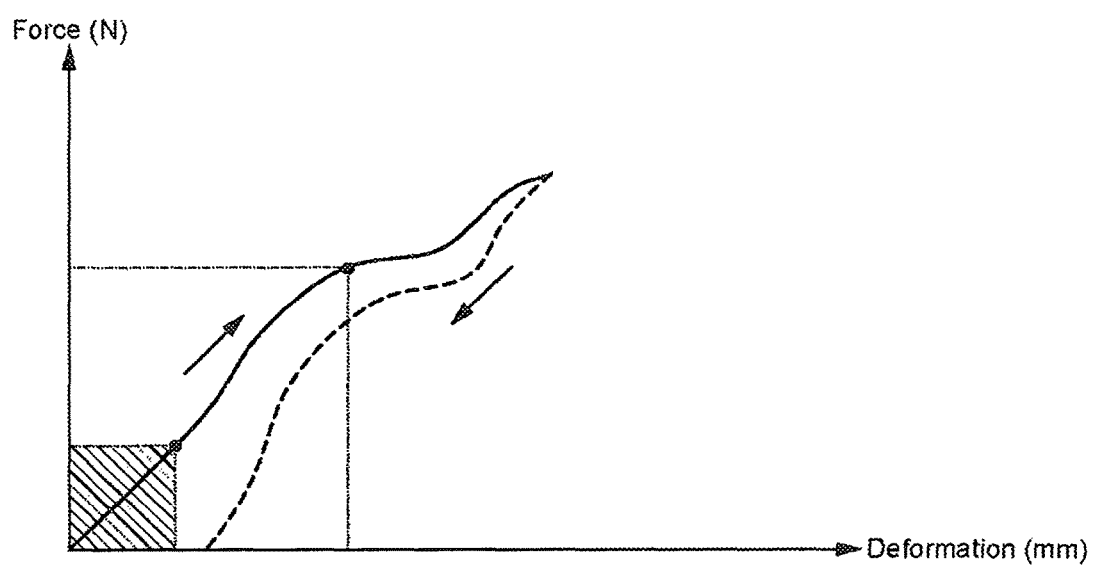
FIG. 14 represents schematically and graphically the evolution of the elastic and plastic deformation of a solid deformable mechanical element as a function of the force applied to the same (solid line), and its recovery when the force applied is released (dotted line).

In the case of the present invention, it is assumed that the deformable portion of the coding insert is a complex spring element, which produces a force under deformation that is not necessarily linearly linked to the deformation amplitude, as illustrated for instance in FIG. 14.

In all of the embodiments described above, the deformable portion is deformable with an amplitude comprised between 0.1 mm and 20 mm, preferably comprised between 0.15 mm and 10 mm, more preferably comprised between 0.5 mm and 5 mm.

In all the above embodiments, the characteristics of the specific deformation properties of the deformable portion comprise the measurement of the reaction force of said deformable portion in relation to the amplitude of deformation of said deformable portion. The reaction force can be measured as described above by using a force or pressure sensor. The amplitude of the deformation that is applied on the deformable portion is measured by an optical sensor, electro-mechanical sensor (multi-positions), induction sensor, or any other sensor able to measure the position of the deformed area during its deformation, with a sufficiently high precision (typically a precision of between 0.01 and 0.5 mm).

Preferably, the beverage machines comprises in combination a pressure sensor for sensing the backforce applied to said sensor by the deformable portion of the capsule, and an electromechanical sensor to measure the displacement of said deformable portion while it is deformed. The electromechanical sensor is for instance placed at the surface of one portion of the machine brewing cavity wherein a capsule is inserted, so that said sensor detects the positions of the deformable portion of the capsule as follows: position at rest which corresponds to a an open configuration of the brewing cavity (i.e. no contact between the sensor and the capsule), then intermediate deformation (i.e. the brewing cavity is being closed, so that the sensor contacts the deformable portion of the capsule), and finally full deformation of the deformable portion (i.e. when the brewing cavity of the machine is fully closed onto the capsule in such a way that maximum pressure is applied by the brewing cavity and the sensor onto the deformable portion of the capsule, and such that the deformable portion is therefore deformed with a maximum amplitude).

At least three different measures of the backforce applied by said deformable portion are sensed, for three different positions (i.e. deformation amplitude) of the deformable portion. For instance, the backforce is measured for positions of the deformable portion as follows: firstly, 0 mm displacement (i.e. at rest), then secondly at 0.5 mm displacement, and thirdly at 1 mm displacement. For two different capsules in the kit of capsules according to the invention, the backforce measured by the pressure sensor is different for a same deformation amplitude. The difference in deformation properties that is measured indicates to the machine what kind of capsule is inserted therein, so that the machine program can automatically select appropriate beverage preparation parameters (e.g. appropriate volume of water to inject in the capsule, temperature of the water, etc.).

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A coding insert for associating to a food ingredient capsule adapted to be functionally inserted in a cavity of a food preparation machine,
the coding insert is a disc or a ring that comprises at least one deformable portion that is deformed when the coding insert is inserted into the cavity of the food preparation machine, and/or when the cavity is closed,
so that at least one machine operational parameter is set by detection of a reaction force on the cavity by the at least one deformed portion, to customize machine brewing functional parameters to the coding insert inserted therein with the food ingredient capsule to which the coding insert is associated, the coding insert and the food ingredient capsule forming an insert-capsule assembly,
wherein the at least one deformable portion is selected from the group consisting of:
(i) a series of tongue-shaped protrusions,
(ii) a series of wave-shaped protrusions,
(iii) a coiled spring portion,
(iv) a series of curved flexible arches that extend inwardly and upwardly from a lowermost inner surface of the coding insert, towards a center of the coding insert,
(v) a series of curved protrusions oriented downwardly, which extend from a bottom edge of the coding insert and
(vi) combinations thereof,
the at least one deformable portion is located at the periphery of the coding insert, and
the coding insert is constructed of a thermoplastic material.

2. The coding insert according to claim 1, wherein at least one external dimension of the insert-capsule assembly is greater than a corresponding internal dimension of the cavity, and wherein the at least one deformable portion is located such as to allow the coding insert to compress elastically and fit within the cavity when the cavity is closed in a functional configuration.

3. The coding insert according to claim 1, wherein at least one external dimension of the insert-capsule assembly is smaller than a corresponding internal dimension of the cavity, and wherein the at least one deformable portion is located such as to allow the coding insert to expand elastically and fit within the cavity when the cavity is closed in a functional configuration.

4. The coding insert according to claim 1, wherein the at least one deformable portion is deformable with an amplitude of between 0.1 mm and 20 mm.

5. The coding insert according to claim 1, wherein the at least one deformable portion is oriented such that the at least one deformable portion deforms along an axis substantially parallel to a vertical axis of the food ingredient capsule to which the coding insert is associated.

6. The coding insert according to claim 1, wherein the at least one deformable portion is deformable by action of a force of between 0.2 N and 500 N.

7. A food preparation system comprising a coding insert for associating to a food ingredient capsule adapted to be functionally inserted in a cavity of a food preparation machine, the coding insert is a disc or a ring that comprises at least one deformable portion that is deformed when the coding insert is inserted into the cavity, and/or when the cavity is closed, so that at least one machine operational parameter is set by detection of a reaction force on the cavity by the at least one deformed portion, to customize machine brewing functional parameters to the coding insert inserted therein with the food ingredient capsule to which the coding insert is associated, the coding insert and the food ingredient capsule forming an insert-capsule assembly;
the food ingredient capsule; and
the food preparation machine adapted to cooperate functionally with the capsule-insert assembly, the cavity comprises a force sensitive portion adapted to cooperate With the at least one deformable portion of the coding insert to transmit data relative to food preparation settings, from the coding insert to the food preparation machine, the data being function of mechanical deformation properties of the at least one deformable portion,
wherein the at least one deformable portion is selected from the group consisting of:
(i) a series of tongue-shaped protrusions,
(ii) a series of wave-shaped protrusions,
(iii) a coiled spring portion,
(iv) a series of curved flexible arches that extend inwardly and upwardly from a lowermost inner surface of the coding insert, towards a center of the coding insert,
(v) a series of curved protrusions oriented downwardly, which extend from a bottom edge of the coding insert, and
(vi) combinations thereof,
the at least one deformable portion is located at the periphery of the coding insert, and
the coding insert is constructed of a thermoplastic material.

8. The food preparation system according to claim 7, wherein the force sensitive portion is linked to a control board of the food preparation machine, such that cooperation between the force sensitive portion and the at least one deformable portion is able to trigger an operation within the food preparation machine when the at least one deformable portion transmits a mechanical deformation to a pressure sensitive portion, the operation being a recognition switching the food preparation machine on or off, and/or setting a food preparation parameter.

9. The food preparation system according to claim 8, wherein the pressure sensitive portion is a force sensor connected to an electrical board.

10. The food preparation system according to claim 7 wherein a food product that is a liquid or semi-liquid product is prepared within the food ingredient capsule by injecting a fluid to be mixed with an encapsulated ingredient, at a pressure of between 0.5 and 30 bar.

11. A kit of at least two coding inserts according to claim 1, wherein different coding inserts in the kit comprise deformable portions with different predetermined mechanical properties to customize the machine brewing functional parameters to each coding insert inserted therein with a capsule.

12. The coding insert according to claim 1, wherein the at least one deformable portion is deformable with an amplitude of between 0.5 mm and 5 mm.

13. The coding insert according to claim 1, wherein the at least one deformable portion is deformable by action of a force of between 20 N and 300 N.

14. The food preparation system according to claim 10, wherein the food product is prepared within the food ingredient capsule by injecting the fluid to be mixed with the encapsulated ingredient at a pressure of between 2 and 15 bar.

* * * * *